United States Patent
Elango

(10) Patent No.: US 10,620,980 B2
(45) Date of Patent: Apr. 14, 2020

(54) TECHNIQUES FOR NATIVE RUNTIME OF HYPERTEXT MARKUP LANGUAGE GRAPHICS CONTENT

(71) Applicant: Microsoft Technology Licensing, LLC, Redmond, WA (US)

(72) Inventor: Aravindan Elango, Bangalore (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 67 days.

(21) Appl. No.: 15/938,803

(22) Filed: Mar. 28, 2018

(65) Prior Publication Data

US 2019/0303184 A1 Oct. 3, 2019

(51) Int. Cl.
G06F 9/44 (2018.01)
G06F 9/455 (2018.01)
G06F 8/41 (2018.01)
G06T 15/00 (2011.01)

(52) U.S. Cl.
CPC ............ *G06F 9/45516* (2013.01); *G06F 8/41* (2013.01); *G06F 9/4552* (2013.01); *G06T 15/005* (2013.01)

(58) Field of Classification Search
CPC .................................................. G06F 9/45516
USPC .......................................................... 717/124
See application file for complete search history.

(56) References Cited

U.S. PATENT DOCUMENTS

| | | | |
|---|---|---|---|
| 9,047,390 B2 | 6/2015 | Canitz | |
| 9,176,754 B2 | 11/2015 | Kokkevis et al. | |
| 9,183,020 B1 | 11/2015 | de Icaza et al. | |
| 9,229,790 B2 | 1/2016 | Pierson et al. | |
| 9,361,085 B2 | 6/2016 | El-Gillani | |
| 9,424,089 B2 | 8/2016 | Gibbs et al. | |
| 9,619,858 B1 | 4/2017 | Labour et al. | |
| 10,207,190 B2 * | 2/2019 | Li | A63F 13/50 |
| 2005/0034109 A1 * | 2/2005 | Hamilton | G06F 8/48 717/140 |

(Continued)

FOREIGN PATENT DOCUMENTS

WO 2017105769 A1 6/2017

OTHER PUBLICATIONS

Laird, Cameron, "Unleash the Power of Hardware-Accelerated HTML5 Canvas", Retrieved From <<https://web.archive.org/web/20110913083059/https:/www.htmlgoodies.com/html5/client/unleash-the-power-of-hardware-accelerated-html5-canvas.html#fbid=_zxFqLbTDhs>>, Sep. 13, 2011, 7 Pages.

(Continued)

*Primary Examiner* — Wei Y Zhen
*Assistant Examiner* — Lanny N Ung
(74) *Attorney, Agent, or Firm* — Arent Fox LLP

(57) ABSTRACT

Examples described herein generally relate to natively rendering hypertext markup language (HTML) graphics content associated with source code at a computer device. Specifically, the computer device receives, at a compiler, the source code associated with graphics based content. The computer device further compiles at least a portion of the source code into native code including at least one graphics application program interface (API). Moreover, the computer device further determines, at a native bridge translator, that at least one native API associated with a graphics processing unit of the computer device corresponds to the graphics API. The computer device further transmits the at least one native API to the graphics processing unit for native rendering of the HTML graphics content at the computer device.

18 Claims, 5 Drawing Sheets

(56) References Cited

U.S. PATENT DOCUMENTS

| | | | |
|---|---|---|---|
| 2009/0189890 A1* | 7/2009 | Corbett | G06F 9/505 |
| | | | 345/419 |
| 2013/0127858 A1* | 5/2013 | Leroy | G06T 15/005 |
| | | | 345/426 |
| 2014/0074913 A1* | 3/2014 | Claydon | H04L 67/42 |
| | | | 709/203 |
| 2014/0075304 A1* | 3/2014 | Bailey | G06F 9/453 |
| | | | 715/705 |
| 2016/0029002 A1 | 1/2016 | Balko | |

OTHER PUBLICATIONS

Gamma, et al., "Design Patterns—Elements of Reusable Object-Oriented Software", Published By: Pearson Education India, Jan. 1, 1995, 53 Pages.

"International Search Report and Written Opinion Issued in PCT Application No. PCTUS2019023489", dated Jul. 3, 2019, 10 Pages.

* cited by examiner

TECHNIQUES FOR NATIVE RUNTIME OF HYPERTEXT MARKUP LANGUAGE GRAPHICS CONTENT

BACKGROUND

The present disclosure relates to graphics rendering, and more particularly, to techniques for native runtime of structured markup language graphics on various platforms and/or devices.

Computer devices may include a number of native applications that require complex objects and/or scenes to be rendered, such as computer games. To render such objects and/or scenes, these native applications may use graphics application programming interfaces (APIs) that direct calculations related to graphics rendering to dedicated graphics processing units (GPUs). The additional processing power provided by these GPUs may greatly improve graphics quality and throughput.

Web applications such as web browsers may typically be composed in scripting languages that may be unable to utilize low-level graphics APIs that provide graphics hardware acceleration. Instead, graphics rendering for web applications may typically be performed by central processing units (CPUs) instead of GPUs. The software-based manner of web-based graphics rendering may thus limit the graphics capabilities of web applications. Nonetheless, unlike native applications, web applications provide a number of advantages. For example, web applications may be capable of executing on multiple platforms, do not require installation, and can be more secure than native applications. However, even with the aforementioned advantages, web browsers may be unable to fully utilize the available computing resources (e.g., GPU) to render graphics.

Thus, there is a need in the art for improvements in the rendering of graphics for content associated with web applications.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure provides a method of natively rendering hypertext markup language (HTML) graphics content associated with JavaScript source code at a computer device. The method may include receiving, at a compiler, the source code associated with graphics based content. The method may further include compiling at least a portion of the source code into native code including at least one graphics application program interface (API). Additionally, the method may include determining, at a native bridge translator, that at least one native API associated with a graphics processing unit of the computer device corresponds to the graphics API. The method may also include transmitting the at least one native API to the graphics processing unit for native rendering of the HTML graphics content at the computer device.

The present disclosure provides an apparatus for natively rendering HTML graphics content associated with source code comprising a memory and at least one processor in communication with the memory. The at least one processor may be configured to receive, at a compiler, source code associated with graphics based content. The at least one processor may further be configured to compile at least a portion of the source code into native code including at least one graphics API. Additionally, the at least one processor may be configured to determine, at a native bridge translator, that at least one native API associated with a graphics processing unit of the computer device corresponds to the graphics API. The at least one processor may further be configured to transmit the at least one native API to the graphics processing unit for native rendering of the HTML graphics content at the computer device.

The present disclosure provides a computer-readable medium storing instructions executable by an electronic device for natively rendering HTML graphics content associated with source code at a computer device. The computer-readable medium including at least one instruction for causing the electronic device to receive, at a compiler, source code associated with graphics based content, compile at least a portion of the source code into native code including at least one graphics API, determine, at a native bridge translator, that at least one native API associated with a graphics processing unit of the computer device corresponds to the graphics API, and transmit the at least one native API to the graphics processing unit for native rendering of the HTML graphics content at the computer device.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The present disclosure will be better understood from the following detailed description read in light of the accompanying drawings, wherein like reference numerals are used to designate like parts in the accompanying description.

DETAILED DESCRIPTION

Figure 1:
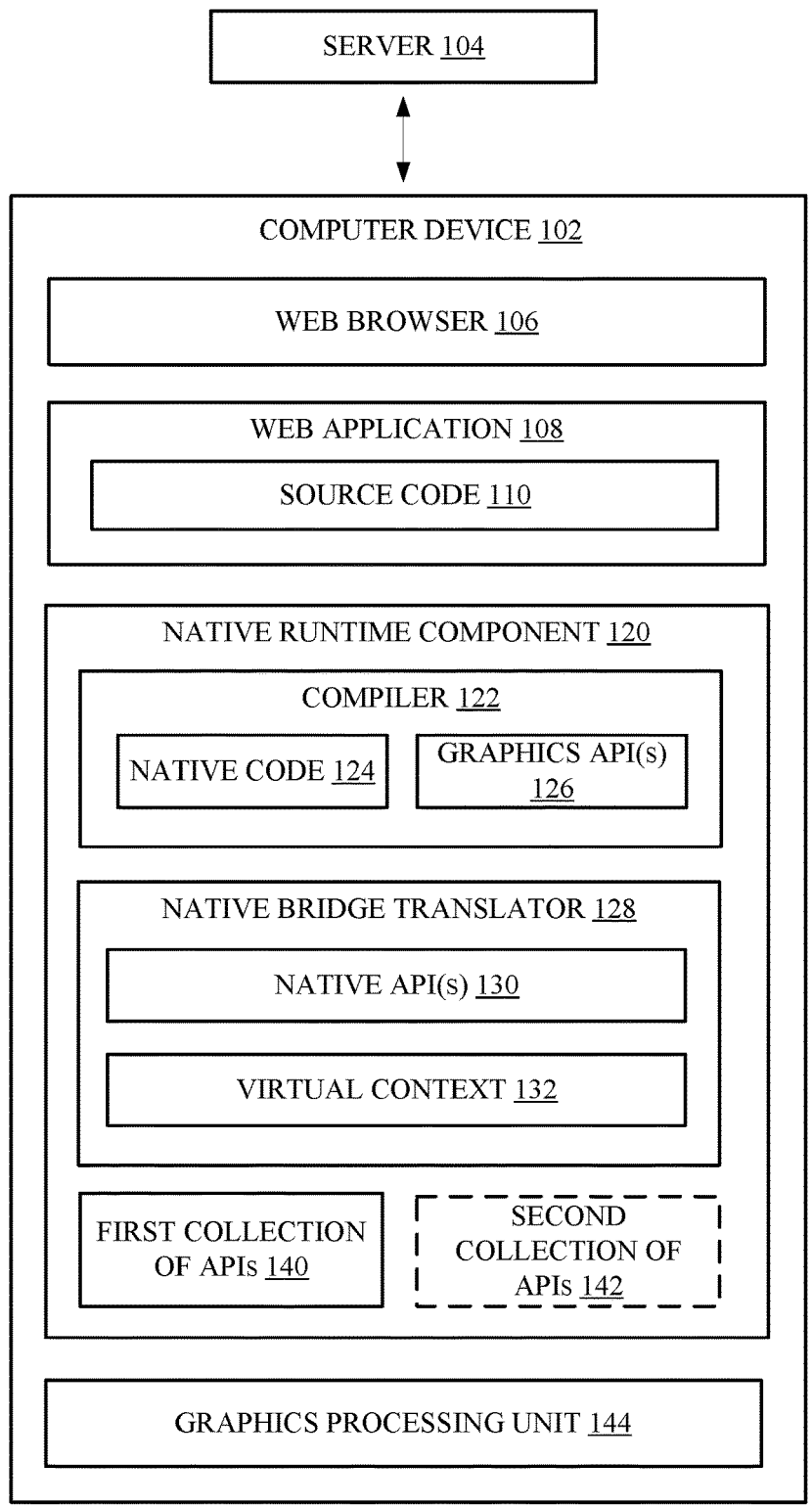
FIG. 1 is a schematic block diagram of an computer device including, among other components, a native runtime component configured to natively run structured markup language content in accordance with an implementation of the present disclosure.

The present disclosure relates to native runtime of structured markup languages on various platforms and/or devices. A native runtime and/or application may be designed for or built into a given system, such as a computer device. For example, hypertext markup language (HTML) is a markup language used for structuring and presenting content on the World Wide Web. Specifically, some technologies may exist to run HTML based content, such as but not limited to HTML5 games in a app-like shell (e.g., hybrid apps). These app shells may be shims that host a web browser component within them and render the HTML/HTML5 content on the web browser component. A shim may be a small library that transparently intercepts API calls and changes the arguments passed, handles the operation itself, or redirects the operation elsewhere. This is equivalent to running the HTML5 content in a web browser. However, these shells only provide an illusion that the HTML5 content/game is running as a native application. As noted above, a native application may be an application that is designed for or built (e.g., installed) into the computer device. Also, this may add one more layer between the game and the actual graphics hardware where the graphics related processing would preferably run on.

Further, a major disadvantage with such an implementation of the HTML graphics content is that the web browser components may be considered "heavy" as they come with a large array of features specific to web browsing scenarios, such as providing an HTTP engine, web security, browsing history/bookmarks management, network connection management, session management, CSS rendering engine, JavaScript runtime, web workers, etc. Nonetheless, some of the aforementioned features may consume a high amount of limited system resources and may not even be relevant and/or otherwise used for a game app. Also, HTML5 content/games running in shims (e.g., web browser component) may be bound to use the rendering mechanism supported by the browser component on the platform. The HTML graphics content/game may not be hardware accelerated during an entire course of execution of the content and may not be optimized on a game-by-game basis, the primary reason being that the web browser components are developed to render websites and not games.

As such, there is a need to improve graphics rendering of HTML graphics content (such as, but not limited to, games) from a web application using dedicated or hardware graphics resources (e.g., GPU) at a computer device. The present implementations provide a native runtime environment for games and/or graphics content developed using structured markup language (e.g., HTML5) graphics API. For example, with such a runtime, developers and/or companies may develop content/games using the two-dimensional (2D) and/or three dimensional (3D) HTML5 graphics API and may release the content on multiple platforms and devices at the same time. The native runtime may take in or receive JavaScript source code of the game and translate the source code into native graphics API (DirectX, Open Graphics Library (OpenGL), Simple Direct Media Layer (SDL), etc.) available on the platform. This may provide improved graphics and a performance increase for the content/game, as the native graphics API runs directly on the graphics hardware (e.g., GPU) available on the platform for computations and/or rendering.

The native graphics API available on the platform may be based on the available hardware, operating system, capabilities of the GPU, graphics drivers, etc. The choice of the native graphics API for the content/game may be determined based on an optimum level of performance for the game to be run on the platform. This can either be determined by the developer or can be determined dynamically by the runtime based on the game's metadata, the platform's configuration, and/or graphics processing capabilities. The native runtime of the present implementations extends the support matrix for HTML5 games beyond browsers to devices such as mobile phones, tablets, personal computers, and gaming consoles, natively using the native graphics API.

For example, in some implementations, the computer device may natively render HTML graphics content associated with source code at a computer device. The computer device may further receive, at a compiler (e.g., JavaScript engine/compiler), the source code associated with graphics based content (e.g., web based game). Further, the computer device may compile and/or parse at least a portion of the source code into native binary code including at least one graphics API. The computer device may determine, at a native bridge translator, that at least one native API associated with a graphics processing unit of the computer device corresponds to the graphics API. The computer device may transmit the at least one native API to the graphics processing unit for native rendering of the HTML graphics content at the computer device. The present implementations may also be applicable to other structured markup languages (SGML, XHTML etc.) used to encode documents or web content.

Referring now to FIG. 1, an example computing system 100 may include a computer device 100 in communication with at least one server 104. The computer device 102 may include a web application 108 running within a web browser 106 and a native runtime component 120. Each of these components is described in further detail below.

Computer device 102 may include any mobile or fixed computer device, which may be connectable to a network. Computer device 102 may be, for example, a computer device such as a desktop or laptop or tablet computer, a server, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

The computer device 102 may include a memory and CPU (not shown) configured to control the operation of the computer device 102. The memory may be configured for storing data and/or computer-executable instructions defining and/or associated with an operating system and/or application, and CPU may execute operating system and/or application. An example of memory can include, but is not limited to, a type of memory usable by a computer, such as random access memory (RAM), read only memory (ROM), tapes, magnetic discs, optical discs, volatile memory, non-volatile memory, and any combination thereof. Memory may store local versions of applications being executed by CPU.

The CPU may include one or more processors for executing instructions. An example of CPU can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. Further, the operating system may include instructions (such as one or more applications) stored in memory and executed by the CPU. The computer device 102 may also include an application including instructions stored in memory and executed by the CPU. The application, for example, may be a analytics application that provides telemetry-based analytics to identify and remediate top end-user impacting issues.

Additionally, the computer device 100 may include an operating system (not shown) that coordinates the utilization of hardware and/or software resources on the computer device 102, as well as one or more applications (e.g., web browser 106 and web application 108) that perform specialized tasks and/or provide additional functionality. To perform tasks for the user, applications may use hardware resources (processor, memory, I/O components, wireless transmitter, graphics-processing unit (GPU) 144, etc.) on the computer device 102 from the operating system, in addition to interacting with the user through a hardware and/or software framework provided by the operating system.

The computer device 102 may include functionality to execute both native applications and non-native applications. Although a native application may be an application program that has been developed for use on a particular platform or device, a non-native application may be one that has been developed for us on multiple platforms or devices. In particular, the computer device 102 may include native applications, such as web browser 106, that are locally installed on the computer device 102 and specific to the operating system and/or one or more hardware devices on the computer device 102. Such applications may be compiled into native (e.g., machine) code via a compiler 122 that executes directly on one or more CPUs of the computer device 102. Code execution for such applications may further be optimized by writing the applications in a combination of general-purpose programming languages (C, C++, etc.) and assembly language, and utilizing libraries that provide hardware acceleration (e.g., graphics hardware acceleration) to the applications.

Moreover, the computer device 102 may also include functionality to execute platform-independent, non-native applications. Specifically, the computer device 102 may obtain the web application 108 from one or more servers (e.g., server 104) using a network connection with the one or more servers and load the web application 108 in web browser 106. For example, the web application 108 may be downloaded from an application server over the Internet by the web browser 106.

The web application 108 may provide features and/or user interactivity similar to native applications on the computing system 102. For instance, the web application 108 may function as a computer game, email client, document editor, media player, and/or computer-aided design (CAD) system. Web application 108 may also include dynamic user interface elements such as menus, buttons, windows, sub-windows, icons, animations, and/or other graphical objects that emulate analogous user interface elements in native applications. In other words, the web application 108 may correspond to a rich Internet application (RIA).

In addition, the web application 108 may execute on the computer device 102 irrespective of a type of platform (operating system, drivers, etc.) associated with the computer device 102. Though platform-independent applications such as web application 108 may be more portable compared to native applications, such applications may lack certain performance capabilities of native applications.

Specifically, non-native applications such as the web application 108 may be formed or written using scripting languages such as JavaScript (JavaScript™ is a registered trademark of Sun Microsystems, Inc.). The interpreted nature of web application 108 and/or other non-native applications may result in significantly slower execution times for the non-native applications than those of compiled native applications. Non-native applications may also be unable to use low-level libraries and/or APIs that are available for use by native applications. As a result, non-native applications may provide limited functionality in certain tasks.

In particular, the web application 108 may be unable to use graphics hardware acceleration (e.g., from GPU 144) in graphics rendering. For instance, the web application 108 may be written in a language (e.g., JavaScript) that lacks an interface with GPU 144 and/or may be limited in issuing rendering commands at a speed/rate that fully utilizes the hardware acceleration provided by the GPU 144. Instead, graphics rendering for web application 108 may be performed using software that executes on a CPU of the computer device 102 rather than the GPU 144. Consequently, the rendered graphics/content in the web application 108 may be suboptimal compared to graphics in native applications that employ or use graphics hardware acceleration.

The drawbacks in graphics rendering for the web application 108 may also preclude the web application 108 from providing features that use significant graphics-processing resources, including graphics hardware acceleration via the GPU 144. In particular, the web application 108 may be unable to efficiently render a high number of objects and/or a complex 3D model for a web-based computer game.

As such, to provide hardware acceleration using the GPU 144 for the web application 108, the computer device 102 may include a native runtime component 120, which may be configured to translate or bind a graphics API 126 of or associated with the web application 108 to at least one native API 130 of or associated with the GPU 144. Specifically, the native runtime component 120 may receive HTML source 110 of the web application 108 at the compiler 122. The compiler 122 may compile or parse the source code 110 into native code 124 including the at least one graphics API 126. In some implementations, the source code 110 may correspond to a set of instructions and/or executables associated with a particular language forming the web application 108. The native code 124 may correspond to a modified form of the set of instructions and/or executables following compilation of the compiler 122. Further, a native bridge translator 128 may analyze one or more parameters of the at least one graphics API 126 such as a function parameter and/or an input parameter and determine one or more corresponding native APIs 130 that achieve the desired function. The function parameter may specify a graphics-related operation (e.g., draw line API). The input parameter may specify one or more data points used to perform the function. In some implementations, a single graphics API 126 may correspond to a single native API 130. In some implementations, a single graphics API 126 may correspond to multiple native APIs 130.

Upon translating or binding the at least one graphics API 126 to the one or more native APIs 128, the native bridge translator 128 may provide the one or more native APIs 130 to the graphics processing unit 144 for native rendering of the graphics of the web application 108. In some implementations, the at least one graphics API 126 may not be immediately needed or used by the GPU 132. That is, during rendering of the graphics for web application 108, although the at least one graphics API 126 is obtained from the native code 124 following compiling by the compiler 122, the at least one graphics API 126 may not be required for graphics rendering. Accordingly, the at least one graphics API may be stored in or form part of a virtual context corresponding to one or more APIs that have yet to be called or utilized by the GPU 144 for rendering of the web application 108.

Further, computer device 102 may include a first collection of APIs 140 and a second collection of APIs 142 for rendering graphics according to distinct sets of program interfaces associated with the GPU 144. A collection of APIs may include one or more individual APIs each defining or representing a distinct functionality and/or subroutine for performing a graphics related operation. In some implementations, the computer device 102 may determine which collection or set of APIs to use based on metadata of the web application 108 and/or capabilities of the GPU 144.

Figure 2:
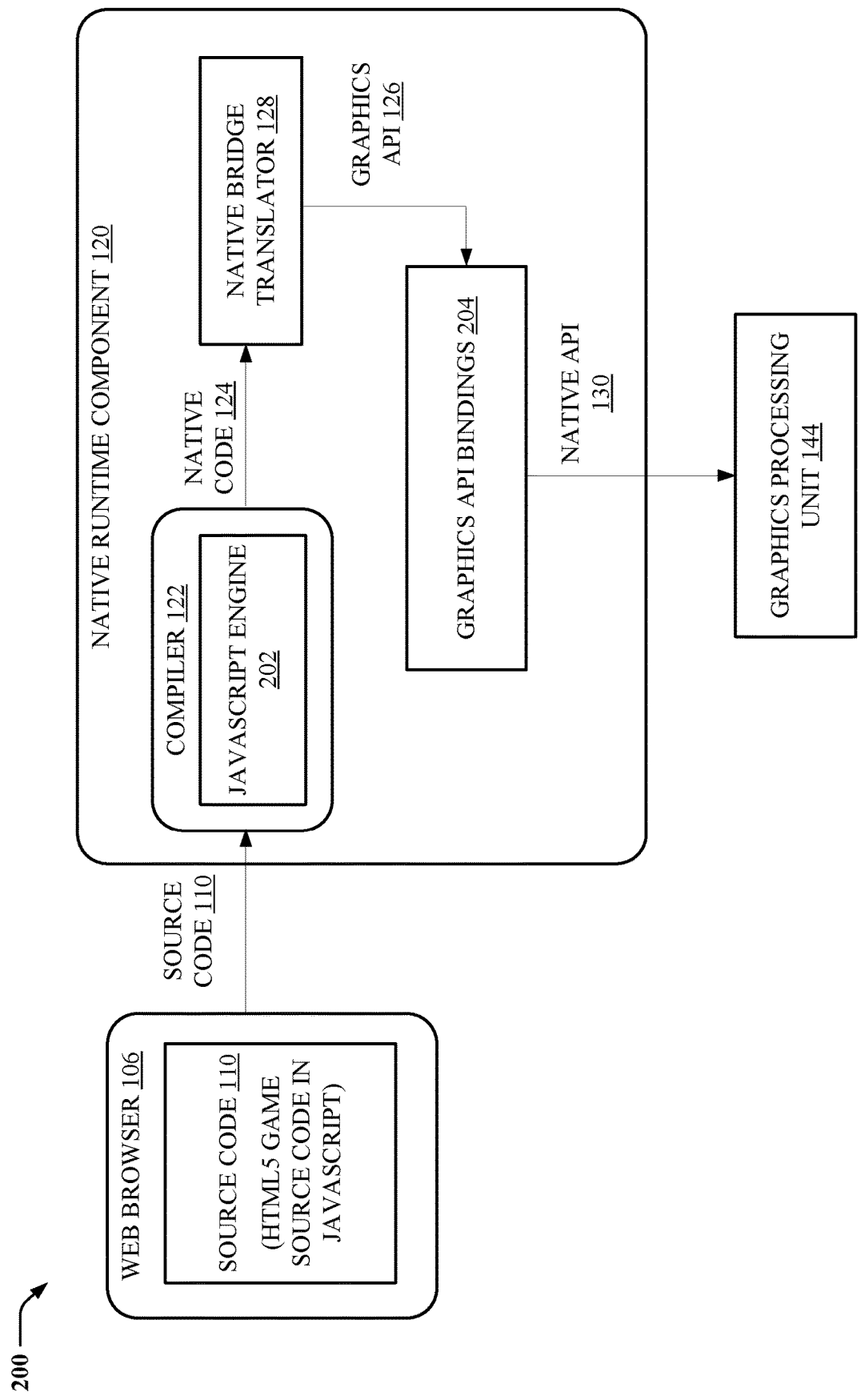
FIG. 2 is a schematic diagram of a processing flow of source code within the native runtime component in accordance with an implementation of the present disclosure.

Referring to FIG. 2, a schematic diagram 200 provides a processing flow of source code within the native runtime component 120. The native runtime component 120 may include a number of components including a JavaScript engine 202 forming the compiler 122 and the native bridge translator 128. The JavaScript engine 202 may be a JavaScript compiler and the native bridge translator 128 may be a component that provides translation from the HTML5 2D and 3D graphics API (e.g., graphics API(s) 126) to the native graphics API (e.g., native API(s) 130).

The native runtime component 120 may take an HTML5 graphics API compliant source code (e.g., source code 110) as an input. The source code 110 may then be passed to the JavaScript engine 202 which compiles the source code 110 and binds the HTML5 graphics API calls to native (graphics) API 130 calls using the native bridge translator 128. In other words, the native runtime component 120 compiles the source code 110 into native (machine) code 124, and in the process, replaces the calls to HTML5 graphics API 126 with the calls to native (graphics) API 130. This results in a high performance binary compiled just in time for the HTML5 game which uses the native (graphics) API 130 to perform computations and rendering directly on the graphics hardware (e.g., GPU 144).

The native bridge component 120 may provide bindings to a number of native graphics API that are available on different platforms and devices. Any updates and/or enhancements to the collection of native graphics APIs are abstracted within the native bridge component 120, making the actual HTML5 games immune to the changes in the native API. This may also enable the HTML5 games to leverage the latest developments and advanced graphics features that come from time to time in the native graphics API.

The native runtime for HTML5 games disclosed herein may be built into the operating system to provide the capability to run HTML5 games natively. This may enable multiple devices and/or platforms including mobile phones, tablets, PCs running different operating systems, gaming consoles, and augmented reality systems to run HTML5 games and graphics content natively.

The native runtime may also dynamically determine rendering using one of the available native graphics APIs based on the metadata from the source code 110 (e.g., game application) and/or the system's graphics capabilities. In this way, the games run on an optimal configuration using the native graphics API to provide an improved graphics experience and higher performance compared to running the game on web browsers and/or web browser based shims.

Further, the native runtime component 120 may be implemented on any computing platform/device that has graphics processing and rendering capabilities. The native runtime component 120 translates HTML5 graphics API 126 into one of the native (graphics) API 130 supported by the underlying platform, using a JavaScript engine 202. When implemented on any platform, the native runtime component 120 may provide a performance boost and improved graphics experience for the HTML5 content because of the native advantage. As a part of the translation to native graphics API 130, the native runtime component 120 may provide a collection of native graphics API and parameters that may result in an improved graphics experience for the game/graphics content on the target platform—which may range from mobile, tablet, PC, gaming consoles and AR/VR/MR platforms.

As such, the native runtime component 120 may enable HTML5 games to run natively on multiple platforms and devices. Further, the native runtime component 120 may provide a configurable native runtime baked inside gaming consoles to render HTML5 games and graphics using the native (graphics) API 130. The native runtime component 120 may further capability to a web browser 106 to pop-out a native shell for rendering HTML5 canvas graphics content just like a native application on demand. The native runtime component 120 may take the form of an application shell or a graphics shell to distribute HTML5 games to be run natively in a platform-agnostic and hardware-agnostic manner. In addition, the native runtime component 120 may provide capability to a web browser to run HTML5 graphics content in a configurable graphics shell that dynamically chooses the best configuration and native graphics API which is optimal for the content for running on the platform. The present implementations may also be applicable to other structured markup languages (SGML, XHTML etc.) used to encode documents or web content.

Figure 3A:
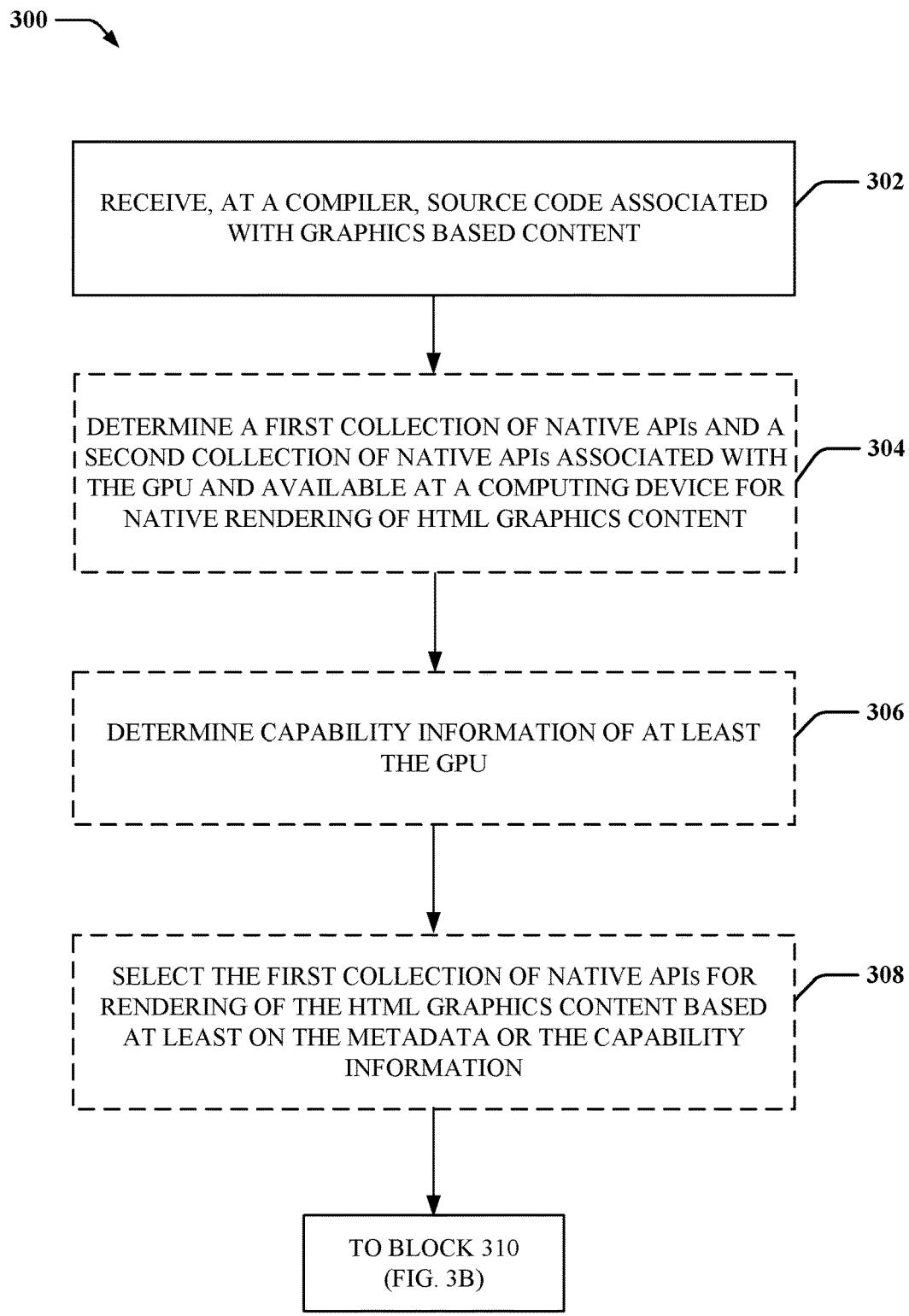
FIGS. 3A and 3B are flow charts of a method of native runtime of graphics content in accordance with an implementation of the present disclosure.
Figure 3B:
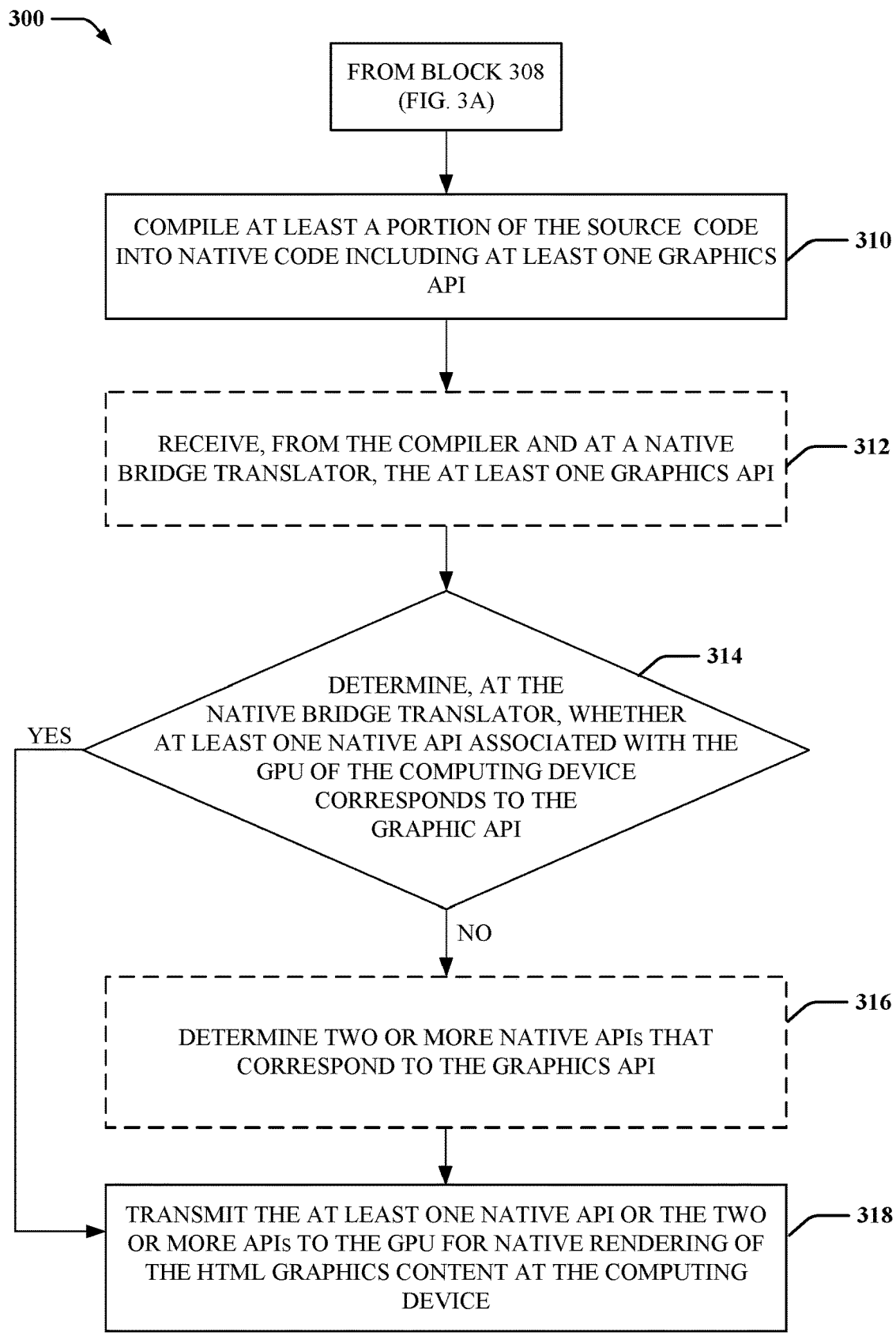

Referring now to FIGS. 3A and 3B, an example method 300 for natively rendering HTML graphics content associated with source code 110 of a web application 108 at a computer device 102. The actions illustrated in method 300 may overlap in time. For example, at an instant in time, two of the actions may be performed by different components. The execution of the actions may also be interleaved on a component. Additionally, the actions illustrated in method 300 may be performed in an order other than illustrated in FIGS. 3A and 3B.

At block 302, the method 300 may receive, at a compiler, the source code associated with graphics based content. For example, as described herein, the computer device 102 may execute the native runtime component 120 to receive, at a compiler 122, the source code 110 associated with graphics based content of the web application 108. In some implementations, the source code may be JavaScript source code.

In some implementations, the source code 110 may correspond to JavaScript source code. Further, in some implementations, the source code 100 may include metadata. The metadata may include a minimum graphics features/capabilities required on the platform for the game to be run. For example, the features/capabilities may include one or more of antialiasing, double buffering, alpha, pixel depth, post-processing parameters, targeted frames per second (FPS) information. In some implementations, the source code 110 may HTML5 source code. In some implementations, the source code 110 is received from or forms part of the web application 108. In some implementations, the compiler 122 may correspond to a JavaScript compiler.

At block 304, method 300 may determine a first collection of native APIs and a second collection of native APIs associated with the graphics processing unit and available at the computing device for native rendering of the HTML graphics content. For example, as described herein, the computer device 102 may execute the native runtime component 120 to determine a first collection of native APIs 140 and a second collection of native APIs 142 associated with the GPU 144 and available at the computer device 102 for native rendering of the HTML graphics content of the web application 108. A collection of APIs may include one or more individual APIs each defining or representing a distinct functionality and/or subroutine for performing a graphics related operation. The first set and second collection of native APIs may In some implementations, the second collection of native APIs 142 may be different from the first collection of native APIs 140. In some implementations, the at least one native API 130 is part of a first collection of native APIs 140 each having distinct functionalities and associated with the GPU 144.

At block 306, the method 300 may determine capability information of at least the GPU. For example, as described herein, the computer device 102 may execute the native runtime component 120 to determine capability information of at least the GPU 144. The capability information may include at least one of a driver version, supported graphics APIs, a number of graphics cores, clock speed, graphics memory size, texture fill rate.

At block 308, the method 300 may select the first collection of native APIs for rendering of the HTML graphics content based at least on the metadata or the capability information. For example, as described herein, the computer device 102 may execute the native runtime component 120 to select the first collection of native APIs 140 for rendering of the HTML graphics content of the web application 108 based at least on the metadata or the capability information of the GPU 144.

At block 310, the method 300 may compile at least a portion of the source code into native code including at least one API. For example, as described herein, the computer device 102 may execute the native runtime component 120 to compile, using the compiler 122, at least a portion of the source code 110 into native code 124 including at least one graphics API 126.

At block 312, the method 300 may receive, from the compiler and at the native bridge translator, the at least one graphics API. For example, as described herein, the computer device 102 and/or the native runtime component 120 may execute the native bridge translator 128 to receive, from the compiler 122, the at least one graphics API 126. In some implementations, the native bridge translator 128 may be formed as part of the web browser 108 or an application distinct from the web browser 108.

At block 314, the method 300 may determine, at a native bridge translator, whether at least one native API associated with a graphics processing unit of the computing device corresponds to the graphics API. For example, as described herein, the computer device 102 and/or the native runtime component 120 may execute the native bridge translator to determine whether at least one native API 130 associated with a GPU 144 of the computer device 102 corresponds to the graphics API 126.

In some implementations, the at least one graphics API 126 may include one or more parameters for performing a graphics related function associated with the web application 108. In some implementations, determining whether the at least one native API 130 associated with the GPU 144 of the computer device 102 corresponds to the graphics API 126 may include identifying the at least one native API 130 having one or more native parameters that correspond to the one or more parameters of the at least one graphics API 126. In some implementations, the one or more parameters of the at least one graphics API 126 and the one or more native parameters of the at least one native API 130 may each include at least one of an API input parameter or a function parameter.

In some implementations, determining whether the at least one native API 130 associated with the GPU 144 of the computer device 102 corresponds to the graphics API 126 may include, while or during compiling of at least the portion of the HTML source code 110, receiving, at the native bridge translator 128, the least one graphics API 126, determining whether the at least one graphics API 126 has been executed, and forming a virtual context 132 including the at least one graphics API 126 based on determining that the at least one graphics API 126 has not been executed. The virtual context may store or contain any graphics APIs 126 that have been compiled by the compiler 122 but have not been executed or transmitted to the GPU 144.

At block 316, the method 300 may determine two or more native APIs that correspond to the graphics API based on determining that at least one native API associated with the GPU of the computing device does not correspond to the graphics API. For example, as described herein, the computer device 102 may execute the GPU 144 to determine two or more native APIs that correspond to the graphics API 126 based on determining that at least one native API 130 associated with the GPU 144 of the computer device 102 does not correspond to the graphics API 126.

At block 318, the method 300 may transmit the at least one native API or the two or more native APIs to the GPU for native rendering of the HTML graphics content at the computing device based on determining that at least one native API associated with the GPU of the computing device corresponds to the graphics API. For example, as described herein, the computer device 102 may execute the native runtime component 120 to transmit the at least one native API 130 to the GPU 144 for native rendering of the HTML graphics content of the web application 108 at the computer device 102 based on determining that at least one native API 130 associated with the GPU 144 of the computer device 102 corresponds to the graphics API 126. The present implementations may also be applicable to other structured markup languages (SGML, XHTML etc.) used to encode documents or web content.

Figure 4:
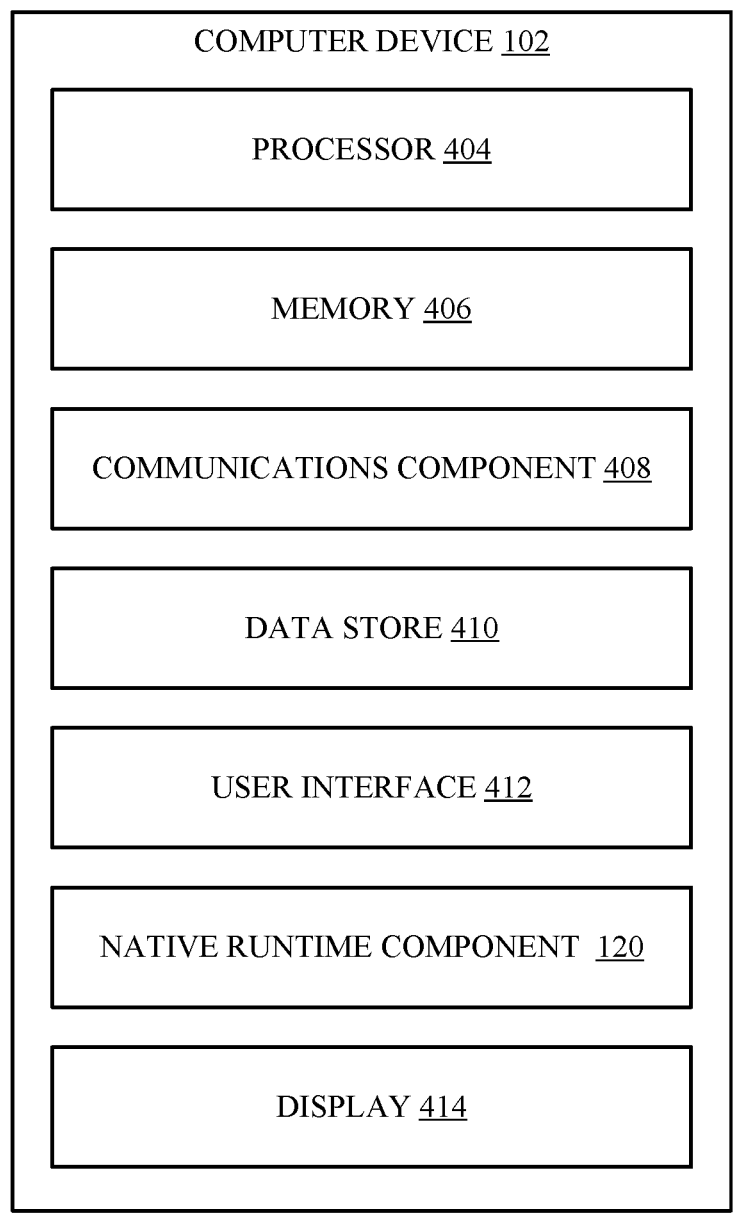
FIG. 4 is a schematic block diagram of an example computer device in accordance with an implementation of the present disclosure.

Referring now to FIG. 4, illustrated is an example computer device 102 in accordance with an implementation, including additional component details (relative to native runtime component 120, web browser 106, and GPU 144) as compared to FIG. 1. In one example, computer device 102 may include processor 404 for carrying out processing functions associated with one or more of components and functions described herein. Processor 404 can include a single or multiple set of processors or multi-core processors. Moreover, processor 404 can be implemented as an integrated processing system and/or a distributed processing system. In an implementation, for example, processor 404 may include a CPU. In an example, computer device 102 may include memory 406 for storing instructions executable by the processor 404 for carrying out the functions described herein.

Further, computer device 102 may include a communications component 408 that provides for establishing and maintaining communications with one or more parties utilizing hardware, software, and services as described herein. Communications component 408 may carry communications between components on computer device 102, as well as between computer device 102 and external devices, such as devices located across a communications network and/or devices serially or locally connected to computer device 102. For example, communications component 408 may include one or more buses, and may further include transmit chain components and receive chain components associated with a transmitter and receiver, respectively, operable for interfacing with external devices.

Additionally, computer device 102 may include a data store 410, which can be any suitable combination of hardware and/or software, that provides for mass storage of information, databases, and programs employed in connection with implementations described herein. For example, data store 410 may be a data repository for operating system and/or applications.

Computer device 102 may also include a user interface component 412 operable to receive inputs from a user of computer device 102 and further operable to generate outputs for presentation to the user. User interface component 412 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 412 may include one or more output devices, including but not limited to a display, a speaker, a haptic feedback mechanism, a printer, any other mechanism capable of presenting an output to a user, or any combination thereof.

In an implementation, user interface component 412 may transmit and/or receive messages corresponding to the operation of operating system and/or application. In addition, processor 404 executes operating system and/or application, and memory 406 or data store 410 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of natively rendering hypertext markup language (HTML) graphics content associated with source code at a computer device, comprising:
   receiving, at a compiler, the source code associated with graphics based content;
   compiling at least a portion of the source code into native code including at least one graphics application program interface (API);
   determining, at a native bridge translator, that at least one native API associated with a graphics processing unit of the computer device corresponds to the graphics API, wherein determining that the at least one native API associated with the graphics processing unit of the computer device corresponds to the graphics API includes:
   while compiling at least the portion of the source code:
      receiving, at the native bridge translator, the least one graphics API;
      determining whether the at least one graphics API has been executed; and
      forming a virtual context including the at least one graphics API based on determining that the at least one graphics API has not been executed, the virtual context storing any graphics APIs that have been compiled but have not been executed; and
   transmitting the at least one native API to the graphics processing unit for native rendering of the HTML graphics content at the computer device.

2. The method of claim 1, wherein the at least one graphics API includes one or more parameters for performing a graphics related function, and
   wherein determining that the at least one native API associated with the graphics processing unit of the computer device corresponds to the graphics API includes identifying the at least one native API having one or more native parameters that correspond to the one or more parameters of the at least one graphics API.

3. The method of claim 2, wherein the one or more parameters of the at least one graphics API and the one or more native parameters of the at least one native API each include at least one of an API input parameter or a function parameter.

4. The method of claim 1, wherein the at least one native API is part of a first collection of native APIs each having distinct functionalities and associated with the graphics processing unit.

5. The method of claim 4, wherein the source code includes metadata, the method further comprising:
   determining a second collection of native APIs associated with the graphics processing unit and available at the computer device for native rendering of the HTML graphics content, the second collection of native APIs different from the first collection of native APIs;
   determining capability information of at least the graphics processing unit; and
   selecting the first collection of native APIs for rendering of the HTML graphics content based at least on the metadata or the capability information.

6. The method of claim 1, further comprising receiving, from the compiler and at the native bridge translator, the at least one graphics API.

7. The method of claim 1, wherein the compiler corresponds to a JavaScript compiler.

8. The method of claim 1, wherein the source code corresponds to HTML5 source code.

9. The method of claim 1, wherein the source code is received from a web application.

10. The method of claim 9, wherein the native bridge translator is formed as part of a web browser or an application distinct from the web browser.

11. A computer device for natively rendering hypertext markup language (HTML) graphics content associated with source code, comprising:
   a memory; and
   at least one processor in communication with the memory, wherein the at least one processor is configured to:
      receive, at a compiler, source code associated with graphics based content;
      compile at least a portion of the source code into native code including at least one graphics application program interface (API);
      determine, at a native bridge translator, that at least one native API associated with a graphics processing unit of the computer device corresponds to the graphics API, wherein to determine that the at least one native API associated with the graphics processing unit of the computer device corresponds to the graphics API, the at least one processor is further configured to:
      while compiling at least the portion of the source code:
         receive, at the native bridge translator, the least one graphics API;
         determine whether the at least one graphics API has been executed; and
         form a virtual context including the at least one graphics API based on determining that the at least one graphics API has not been executed, the virtual context storing any graphics APIs that have been compiled but have not been executed; and
      transmit the at least one native API to the graphics processing unit for native rendering of the HTML graphics content at the computer device.

12. The computer device of claim 11, wherein the at least one graphics API includes one or more parameters for performing a graphics related function, and
   wherein to determine that the at least one native API associated with the graphics processing unit of the computer device corresponds to the graphics API, the at least one processor is further configured to identify the at least one native API having one or more native parameters that correspond to the one or more parameters of the at least one graphics API.

13. The computer device of claim 12, wherein the one or more parameters of the at least one graphics API and the one or more native parameters of the at least one native API each include at least one of an API input parameter or a function parameter.

14. The computer device of claim 11, wherein the at least one native API is part of a first collection of native APIs each having distinct functionalities and associated with the graphics processing unit.

15. The computer device of claim 14, wherein the source code includes metadata, and wherein the at least one processor is further configured to:
   determine a second collection of native APIs associated with the graphics processing unit and available at the computer device for native rendering of the HTML graphics content, the second collection of native APIs different from the first collection of native APIs;

determine capability information of at least the graphics processing unit; and select the first collection of native APIs for rendering of the HTML graphics content based at least on the metadata or the capability information.

16. The computer device of claim 11, wherein the at least one processor is further configured to receive, from the compiler and at the native bridge translator, the at least one graphics API.

17. The computer device of claim 11, wherein the compiler corresponds to a JavaScript compiler.

18. A non-transitory computer-readable medium storing instructions executable by an computer device for natively rendering hypertext markup language (HTML) graphics content associated with source code at a computer device, comprising at least one instruction for causing the computer device to:

receive, at a compiler, source code associated with graphics based content;

compile at least a portion of the source code into native code including at least one graphics application program interface (API);

determine, at a native bridge translator, that at least one native API associated with a graphics processing unit of the computer device corresponds to the graphics API, wherein to determine that the at least one native API associated with the graphics processing unit of the computer device corresponds to the graphics API includes:

while compiling at least the portion of the source code:
  receive, at the native bridge translator, the least one graphics API;
  determine whether the at least one graphics API has been executed; and
  form a virtual context including the at least one graphics API based on determining that the at least one graphics API has not been executed, the virtual context storing any graphics APIs that have been compiled but have not been executed; and transmit the at least one native API to the graphics processing unit for native rendering of the HTML graphics content at the computer device.

* * * * *